US012666445B2

(12) United States Patent
Zhang et al.

(10) Patent No.: US 12,666,445 B2
(45) Date of Patent: Jun. 23, 2026

(54) INFORMATION TRANSMISSION METHOD AND APPARATUS, AND COMPUTER READABLE STORAGE MEDIUM

(71) Applicants:China Mobile Communication Co., Ltd Research Institute, Beijing (CN); China Mobile Communications Group Co., Ltd., Beijing (CN)

(72) Inventors: Yi Zhang, Beijing (CN); Xiaodong Xu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 449 days.

(21) Appl. No.: 18/043,440

(22) PCT Filed: Sep. 17, 2021

(86) PCT No.: PCT/CN2021/119000
§ 371 (c)(1),
(2) Date: Feb. 28, 2023

(87) PCT Pub. No.: WO2022/057884
PCT Pub. Date: Mar. 24, 2022

(65) Prior Publication Data
US 2024/0032068 A1 Jan. 25, 2024

(30) Foreign Application Priority Data
Sep. 18, 2020 (CN) .......................... 202010990272.6

(51) Int. Cl.
*H04W 72/25* (2023.01)
*H04B 17/318* (2015.01)
*H04W 72/0446* (2023.01)

(52) U.S. Cl.
CPC .......... *H04W 72/25* (2023.01); *H04B 17/328* (2023.05); *H04W 72/0446* (2013.01)

(58) Field of Classification Search
CPC . H04W 72/25; H04W 72/0446; H04B 17/328
See application file for complete search history.

(56) References Cited

U.S. PATENT DOCUMENTS

2018/0206251 A1* 7/2018 Chen ...................... H04W 72/04
2018/0206260 A1* 7/2018 Khoryaev ............. H04W 72/56
(Continued)

FOREIGN PATENT DOCUMENTS

CN 110972297 A 4/2020
CN 111277973 A 6/2020
(Continued)

OTHER PUBLICATIONS

LG Electronics, Discussion on feasibility and benefits for mode 2 enhancement, 3GPP TSG RAN WG1 Meeting #102-e, R1-2005749, Aug. 17-28, 2020, e-Meeting.
(Continued)

*Primary Examiner* — Brenda H Pham
(74) *Attorney, Agent, or Firm* — Price Heneveld LLP

(57) ABSTRACT

An information transmission method, device, and a computer-readable storage medium are provided. The method includes: when a first terminal satisfies a first condition, transmitting sidelink control information SCI, wherein the first condition is defined by a protocol, is pre-configured, or is configured by a network side or a second terminal through a higher layer signaling.

4 Claims, 2 Drawing Sheets

Transmitting Sidelink control information (SCI) when a first condition is satisfied; wherein the first condition is defined by a protocol, is preconfigured, or is configured by a network side or a second terminal through a high-layer signaling ⟋⟍ 101

Determining a resource subset to be reported to a higher layer ⟋⟍ 102

(56) References Cited

U.S. PATENT DOCUMENTS

| | | | |
|---|---|---|---|
| 2019/0104525 A1* | 4/2019 | Santhanam | .......... H04W 72/02 |
| 2021/0297994 A1 | 9/2021 | Zhang | |
| 2023/0040934 A1 | 2/2023 | Qu | |

FOREIGN PATENT DOCUMENTS

| | | |
|---|---|---|
| CN | 111278108 A | 6/2020 |
| WO | 2020033381 A1 | 2/2020 |
| WO | 2020169024 A1 | 8/2020 |

OTHER PUBLICATIONS

3rd Generation Partnership Project, Technical Specification Group Radio Access Network, NR, "Multiplexing and channel coding", (Release 16), 3GPP TS 38.212, V16.2.0, Jun. 2020, Valbonne, France.

3rd Generation Partnership Project, Technical Specification Group Radio Access Network, NR, "Physical layer procedures for data", (Release 16), 3GPP TS 38.214, V16.2.0, Jun. 2020, Valbonne, France.

3rd Generation Partnership Project, Technical Specification Group Radio Access Network, NR, "Medium Access Control (MAC) protocol specification", (Release 16), 3GPP TS 38.321, V16.1.0, Jul. 2020, Valbonne, France.

CMCC, "Discussion on resource allocation mechanism for NR V2X", 3GPP TSG RAN WG1 Meeting #95, R1-1812880, Nov. 12-16, 2018, Spokane, Washington, USA.

Intel Corporation, "Physical Layer Procedures for NR V2X Sidelink Design", 3GPP TSG RAN WG1 RAN1#96, R1-1903450, Feb. 25-Mar. 1, 2019, Athens, Greece.

Robert Bosch Gmbh, "Sidelink Resource Allocation Enhancements", 3GPP TSG RAN WG1 #102-e, R1-2006876, Aug. 17-28, 2020, E-Meeting.

LG Electronics, "Discussion on resource allocation for Mode 2", 3GPP TSG-RAN WG1 Meeting #100, R1-2000783, eMeeting, Feb. 24-Mar. 6, 2020.

Moderator (Intel Corporation) "Outcome of [100b-e-NR-5G_V2X_NRSL-Mode-2-05] and proposed TPs", 3GPP TSG-RAN WG1 Meeting #100bis-E, R1-2002950, eMeeting, Apr. 20-30, 2020.

ZTE Corporation, Sanechips, "Discussion on remaining HARQ issues", 3GPP TSG-RAN WG2 Meeting #110-e, R2-2004580, Online, Jun. 1-12, 2020.

Intel Corporation, "Outcome of email thread [100e-NR-5G_V2X_NRSL-RA_Mode2-03]", 3GPP TSG RAN WG1 Meeting #100-E, R1-2001346, e-Meeting, Feb. 24-Mar. 6, 2020.

Moderator (Intel Corporation), "Fl summary#2 of critical issues for 7.2.4.2.2—V2X Mode 2", 3GPP TSG RAN WG1 Meeting #101-E, R1-2004715, e-Meeting, May 25-Jun. 5, 2020.

LG Electronics, "Discussion on resource allocation for Mode 2", 3GPP TSG RAN WG1 Meeting #101, R1-2003563, e-Meeting, May 25-Jun. 5, 2020.

* cited by examiner

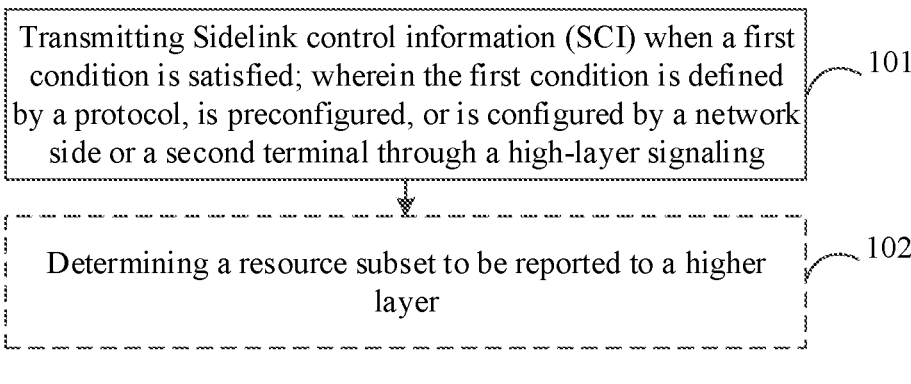

Transmitting Sidelink control information (SCI) when a first condition is satisfied; wherein the first condition is defined by a protocol, is preconfigured, or is configured by a network side or a second terminal through a high-layer signaling ⌒ 101

Determining a resource subset to be reported to a higher layer ⌒ 102

FIG. 1

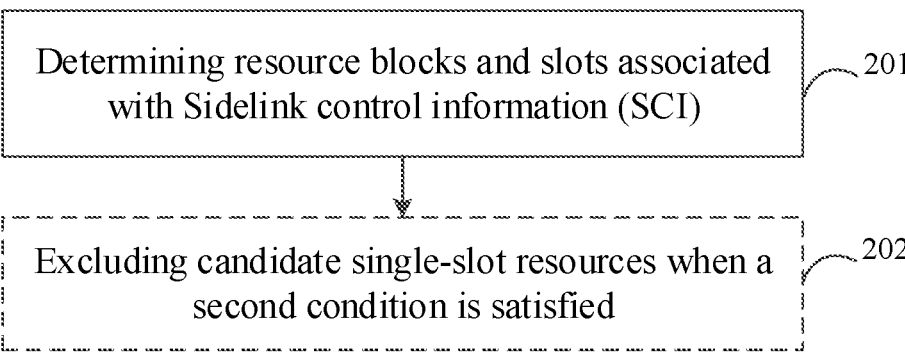

Determining resource blocks and slots associated with Sidelink control information (SCI) ⌒ 201

Excluding candidate single-slot resources when a second condition is satisfied ⌒ 202

FIG. 2

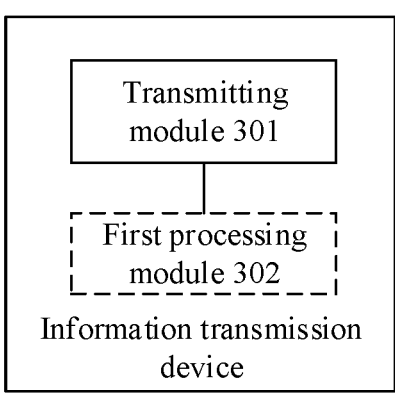

Transmitting module 301

First processing module 302

Information transmission device

INFORMATION TRANSMISSION METHOD AND APPARATUS, AND COMPUTER READABLE STORAGE MEDIUM

CROSS-REFERENCE TO RELATED APPLICATION

This application is a U.S. national phase application of a PCT Application No. PCT/CN2021/119000 filed on Sep. 17, 2021, which claims a priority to Chinese Patent Application No. 202010990272.6 filed on Sep. 18, 2020, the disclosures of which are incorporated in their entirety by reference herein.

TECHNICAL FIELD

The embodiments of the present disclosure relate to the technical field of mobile communications, and more particularly, relate to an information transmission method, an information transmission device, and a computer-readable storage medium.

BACKGROUND

A process of selecting resources for vehicular wireless communication (Vehicle to Everything, V2X) is performed by a UE at a transmitting end, and the selected resources are resources with relatively small interference from the perspective of the transmitting end UE. However, due to complexity of road conditions, resource usage situations seen by a UE at a receiving end and a UE at a transmitting end may be quite different, i.e., a "hidden nodes" problem may exist. If transmission resources are determined only from the perspective of the UE at the transmitting end, it is easy for the UE at the receiving end to suffer serious interference on the selected transmission resources, resulting in low SINR and incorrect data demodulation.

SUMMARY

In light of the above, an objective of the embodiments of the present disclosure is to provide an information transmission method, an information transmission device, and a computer-readable storage medium.

To achieve the above objective, technical solutions of the embodiments of the present disclosure are implemented as follow.

An information transmission method performed by a first terminal is provided in the embodiments of the present disclosure. The method includes:

transmitting Sidelink control information (SCI) when a first condition is satisfied; wherein the first condition is defined by a protocol, is preconfigured, or is configured by a network side or a second terminal through a high-layer signaling.

The first condition includes at least one of following:

reference signal received power (RSRP) measurement performed for a received SCI format is higher than a first threshold;

a priority value indicated by a priority field in the received SCI format is below a second threshold;

the RSRP measurement performed for the received SCI format is higher than the first threshold, and the priority value indicated by the priority field in the received SCI format is below the second threshold;

slots and/or resource blocks determined by received multiple SCI formats overlap;

a first distance is less than or equal to a first preset distance, and/or a second distance is greater than or equal to a second preset distance; the first distance is a distance between a position of the first terminal and a center position of a nearest zone indicated by a zone identifier Zone_id in a received SCI; the second distance is a distance between the center position of the nearest zone indicated by Zone_id in the received SCI and a position of a second terminal.

The SCI transmitted by the first terminal includes at least one of the following:

a priority which is a value indicated by a priority field in a received SCI format;

a resource reservation period which is a value indicated by a resource reservation period field in the received SCI format;

time domain resource assignment information;

frequency domain resource assignment information.

The time domain resource assignment information includes at least one of following:

first timing information, wherein the first timing information is configured to indicate an offset value of a slot in which the first terminal transmits the SCI relative to a slot in which the received SCI format is located, or an offset value of a slot in which the received SCI format is located relative to a slot in which the first terminal transmits the SCI;

second timing information k, wherein for SCI format reception which ends in a slot n or a Physical Sidelink Shared channel (PSSCH) reception scheduled by the SCI, the first terminal transmits the SCI in a slot n+k; or, for a SCI transmitted in a slot m, the first terminal receives a SCI format in a slot m-k;

first indication information, wherein the first indication information is a value indicated by a time domain resource assignment field in the received SCI format.

The frequency domain resource assignment information includes at least one of following:

first offset information, which is an offset value of a sub-channel on which a lowest physical resource block (PRB) of the received SCI format is located relative to a sub-channel on which the lowest PRB transmitting the SCI is located, or an offset value of a sub-channel in which the lowest PRB transmitting the SCI is located relative to a sub-channel in which the lowest PRB of the received SCI format is located;

second offset information p, wherein a sub-channel on which the lowest PRB of the received SCI format is located is q, a sub-channel on which the lowest PRB transmitting the SCI by the first terminal is located is q+p, or, a sub-channel on which the lowest PRB transmitting the SCI by the first terminal is located is r, and a sub-channel on which the lowest PRB of the received SCI format is located is r+p;

second indication information, which is configured to indicate a sub-channel on which the lowest PRB of the received SCI format is located;

third indication information which is a value indicated by a frequency domain resource assignment field in the received SCI format.

Optionally, the method further includes: determining a resource subset to be reported to a higher layer by at least one of the following ways:

a quantity L of sub-channels provided by the higher layer for transmission of a Physical Sidelink Control Channel (PSCCH) or a Physical Sidelink Shared Channel (PSSCH) is 1, or a quantity of sub-channels for transmission of a PSCCH or a PSSCH is set to 1; or, a quantity L of sub-channels provided by the higher layer for the transmission of the PSCCH or the PSSCH is 1, or a quantity L of sub-channels configured for transmission of the PSCCH or PSSCH is 1, and candidate single-slot resources correspond to a number of consecutive L sub-channels in a time interval [n+T1, n+T2]; a start sub-channel of consecutive L sub-channels is the same as a sub-channel on which a lowest PRB of a received SCI format is located.

An information transmission method performed by a second terminal is further provided in the embodiments of the present disclosure. The method includes: determining resource blocks and slots associated with Sidelink control information (SCI).

Determining the resource blocks and the slots associated with the SCI includes: determining the resource blocks and the slots indicated by resources carrying the SCI, and/or time domain resource assignment information and/or frequency domain resource assignment information in the SCI.

The time domain resource assignment information includes at least one of the following:

first timing information, wherein the first timing information is configured to indicate an offset value of a slot in which the SCI is received relative to a slot in which a first resource is located, or an offset value of a slot in which the first resource is located relative to the slot in which the SCI is received;

second timing information k, wherein for the SCI received in a slot m, a slot in which the first resource is located is m-k, or a slot in which the first resource is located is n, the second terminal receives the SCI in a slot n+k;

first indication information, wherein the first indication information is configured to indicate time offset values relative to a first resource, a second resource and/or the third resource.

The frequency domain resource assignment information includes at least one of following:

first offset information, which is an offset value of a start sub-channel of a first resource relative to a sub-channel on which a lowest PRB from which the SCI is received is located, or an offset value of a sub-channel on which a lowest PRB from which the SCI is received is located relative to a start sub-channel of a first resource;

second offset information p, wherein a start sub-channel of a first resource is q, a sub-channel on which a lowest PRB from which the SCI is received is located is q+p, or a sub-channel on which a lowest PRB from which the SCI is received is located is r, a start sub-channel of a first resource is r+p;

second indication information, wherein the second indication information is configured to indicate a start sub-channel of a first resource;

third indication information which is configured to indicate a quantity of sub-channels allocated consecutively for each resource and start sub-channel indexes of remaining SCI indication resources other than the first resource.

Determining the resource blocks and the slots indicated by resources carrying the SCI, and/or the time domain resource assignment information and/or the frequency domain resource assignment information in the SCI includes at least one of the following:

determining a resource slot according to resources of the SCI and/or the time domain resource assignment information in the SCI;

determining a slot in which a first resource is located, according to first timing information or second timing information;

determining time offset values relative to a first resource, a second resource, and/or a third resource according to first indication information.

Determining the resource slot according to the resources of the SCI and/or the time domain resource assignment information in the SCI includes:

for SCI reception which ends in a slot m, determining that the slot in which the first resource is located is a slot m-k.

Determining the resource blocks and the slots indicated by resources carrying the SCI, and/or the time domain resource assignment information and/or the frequency domain resource assignment information in the SCI includes at least one of the following:

determining a sub-channel according to resources of the SCI and/or the frequency domain resource assignment information in the SCI;

determining a start sub-channel of a first resource according to first offset information or second offset information or second indication information;

determining a quantity of sub-channels continuously allocated for each resource and start sub-channel indexes of remaining SCI indication resources other than the first resource according to third indication information.

Determining the sub-channel according to the resources of the SCI and/or the frequency domain resource assignment information in the SCI includes: for a sub-channel r in which a lowest PRB of a received SCI is located, determining a start sub-channel of the first resource to be r+p or r.

Optionally, the method further includes: excluding candidate single-slot resources when a second condition is satisfied, wherein, the second condition is that the resource blocks and the slots indicated by the SCI, or the resource blocks and slots determined according to same or different SCI formats assumed to be received in a second slot set, overlap with the candidate single-slot resources.

An information transmission device applied to a first terminal is further provided in the embodiments of present disclosure. The device includes: a transmitting module configured to transmit Sidelink control information (SCI) when a first condition is satisfied; wherein the first condition is defined by a protocol, is preconfigured, or is configured by a network side or a second terminal through a high-layer signaling.

An information transmission device applied to a first terminal is further provided in the embodiments of the present disclosure. The device includes: a determining module configured to determine resource blocks and slots associated with Sidelink control information (SCI).

An information transmission device is further provided in the embodiments of the present disclosure. The device includes a processor, and a memory for storing a computer program executable on the processor, wherein when the processor executes the computer program, the processor implements steps of the methods described above.

A computer readable storage medium having a computer program stored thereon, wherein when the computer program is executed by a processor, the processor implements steps of the methods described above.

According to the information transmission method, the information transmission device and the compute readable storage medium provided by the embodiments of the present disclosure, Sidelink control information SCI is transmitted when a first terminal satisfies a first condition, wherein the first condition is defined by a protocol, is preconfigured, or is configured by a network side or a second terminal through a high-layer signaling, and accordingly, the second terminal determines resource blocks and slots associated with Side-link control information SCI. In the embodiments of the present disclosure, the first terminal meeting the first con-dition transmits the SCI, so that it can be avoided as much as possible that the second terminal selects resources occu-pied by hiding nodes, interference of data transmission is reduced, and reliability is improved.

BRIEF DESCRIPTION OF THE DRAWINGS

FIG. 1 is a first flowchart of an information transmission method according to the embodiments of the present dis-closure;

FIG. 2 is a second flowchart of an information transmis-sion method according to the embodiments of the present disclosure;

FIG. 3 is a first structural diagram of an information transmission device according to the embodiments of the present disclosure;

DETAILED DESCRIPTION

Figure 4:
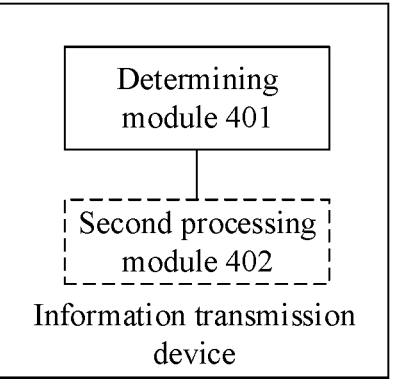
FIG. 4 is a second structural diagram of an information transmission device according to the embodiment of the present disclosure.

The present disclosure will now be described with refer-ence to the drawings and embodiments.

NR V2X supports two resource allocation modes, a Mode-1 resource allocation mode and a Mode-2 resource allocation mode, wherein Mode-1 is a resource allocation mode controlled by a base station, and Mode-2 is a resource allocation mode autonomously determined by a terminal. The Mode-2 resource allocation mode is "Listen Before Talk," and resources to be selected in a selection window are determined based on sensing resources in a sensing window, and a basic operational process is as follows:

1. determining the resource selection window and the sensing window: if resource selection is triggered at time n, then the resource selection window is [n+$T_1$, n+$T_2$], and the sensing window is [n-$T_0$,n-$T_{proc,0}$];
2. sensing process, i.e., demodulating a PSCCH transmit-ted by other terminals in the sensing window, and collecting RSRP information;
3. a resource exclusion process:
   1) V2X is half-duplex and cannot be monitored in its own transmission slot, so it can only be assumed that when one or more resources reserved by other UEs in this slot in all possible cycles configured by a system overlap with candidate resources in the resource selection window, or overlap with periodi-cally reserved resources after the candidate resources, the one or more resources are excluded;
   2) if occupied resources and subsequent one or more reserved resources indicated by decoding SCI over-lap with the candidate resources in the resource selection window or the one or more reserved resources after the candidate resources, and a RSRP is higher than a certain threshold, then the resources are excluded;

4. if remaining resources are less than X % of a complete set, increasing a RSRP threshold by 3 dB, and repeating the resource exclusion step;
5. reporting available resources to a MAC layer, and the MAC layer performs random selection.

It can be seen that, if the transmission resources are determined only from the perspective of the UE at the transmitting end, interference to the UE at the receiving end on the selected transmission resources is likely severe, resulting in low SINR and incorrect data demodulation.

Based on this, the embodiments of the present disclosure provide an information transmission method, as shown in FIG. 1, which is applied to a first terminal. The first terminal includes:

Step 101: when a first condition is satisfied, transmitting Sidelink control information (SCI).

The first condition is defined by a protocol, is preconfig-ured, or is configured by a network side or a second terminal through high-layer signaling.

Here, the high-layer signaling includes SIB RRC MAC signaling.

In the embodiments of the present disclosure, the first condition includes at least one of following:

reference signal received power (RSRP) measurement performed for a received SCI format is higher than a first threshold;

a priority value indicated by a priority field in the received SCI format is below a second threshold;

the RSRP measurement performed for the received SCI format is higher than the first threshold, and the priority value indicated by the priority field in the received SCI format is below the second threshold;

slots and/or resource blocks determined by received mul-tiple SCI formats overlap, wherein the multiple SCI formats may correspond to different Source IDs, and the condition may further include:

the number of overlapping of slots and/or resource blocks determined by the received multiple SCI formats is greater than or equal to a first number threshold;

a first distance is less than or equal to a first preset distance, and/or a second distance is greater than or equal to a second preset distance; the first distance is a distance between a position of a first terminal and a center position of a nearest zone indicated by a zone identifier Zone_id in the received SCI; the second distance is a distance between the center position of the nearest zone indicated by Zone_id in the received SCI and a position of a second terminal.

Here, the position of the second terminal may be the center location of the nearest zone indicated by Zone_id in the SCI transmitted by the second terminal.

The first threshold, the second threshold, the first preset distance, and the second preset distance are defined by a protocol, or is preconfigured, or is configured by the network side or the second terminal through high-layer signaling.

In the embodiments of the present disclosure, the SCI transmitted by the first terminal includes at least one of the following:

a priority which is a value indicated by a priority field in the received SCI format;

a resource reservation period which is a value indicated by a resource reservation period field in the received SCI format;

time domain resource assignment information;

frequency domain resource assignment information.

In the embodiments of the present disclosure, the time domain resource assignment information includes at least one of following:

first timing information, wherein the first timing information is configured to indicate an offset value of a slot in which the first terminal transmits the SCI relative to a slot in which the received SCI format is located, or an offset value of a slot in which the received SCI format is located relative to the slot in which the first terminal transmits the SCI;

second timing information k, wherein for SCI format reception which ends in a slot n or a Physical Sidelink Shared channel (PSSCH) reception scheduled by SCI, the first terminal transmits the SCI in a slot n+k; or, for a SCI transmitted in the slot m, the first terminal receives a SCI format in a slot m−k;

first indication information, wherein the first indication information is a value indicated by a time domain resource assignment field in the received SCI format.

In the embodiments of the present disclosure, the frequency domain resource assignment information includes at least one of following:

first offset information, an offset value of a sub-channel on which a lowest physical resource block (PRB) of the received SCI format is located relative to a sub-channel on which the lowest PRB transmitting the SCI is located, or an offset value of a sub-channel in which the lowest PRB transmitting the SCI is located relative to a sub-channel in which the lowest PRB of the received SCI format is located;

second offset information p, a sub-channel on which the lowest PRB of the received SCI format is located is q, a sub-channel on which the lowest PRB transmitting the SCI by the first terminal is located is q+p, or, a sub-channel on which the lowest PRB transmitting the SCI by the first terminal is located is r, and a sub-channel on which the lowest PRB of the received SCI format is located is r+p;

second indication information, wherein the second indication information is configured to indicate a sub-channel on which the lowest PRB of the received SCI format is located;

third indication information which is a value indicated by a frequency domain resource assignment field in the received SCI format.

In the above solution, the lowest PRB of the received SCI format is the lowest PRB of a PSCCH or a PSSCH of the received SCI format, and the lowest PRB transmitting the SCI is the lowest PRB of a PSCCH or a PSSCH transmitting the SCI.

In the embodiments of the present disclosure, the method further includes:

Step 102: determining a resource subset to be reported to a higher layer by at least one of the following ways:

the number L of sub-channels provided by the higher layer for transmission of a Physical Sidelink Control Channel (PSCCH) or a Physical Sidelink Shared Channel (PSSCH) is 1, or the number of sub-channels for transmission of a PSCCH or a PSSCH is set to 1; or, the number L of sub-channels provided by the higher layer for the transmission of the PSCCH or the PSSCH is 1, or the number L of sub-channels configured for transmission of the PSCCH or PSSCH is 1, and candidate single-slot resources correspond to a number of consecutive L sub-channels in a time interval [n+T1, n+T2]; a start sub-channel of consecutive L sub-channels is the same as the sub-channel on which the lowest PRB of the received SCI format is located.

An embodiment of the present disclosure further provides an information transmission method. As shown in FIG. 2, the method is applied to a second terminal. The method includes:

Step 201: determining resource blocks and slots associated with Sidelink control information (SCI).

In the embodiments of the present disclosure, determining resource blocks and slots associated with the SCI includes: determining the resource blocks and the slots indicated by resources carrying the SCI, and/or time domain resource assignment information and/or frequency domain resource assignment information in the SCI.

The SCI is carried by PSCCH resources or PSSCH resources.

In the embodiments of the present disclosure, the time domain resource assignment information includes at least one of the following:

first timing information, wherein the first timing information is configured to indicate an offset value of a slot in which the SCI is received relative to a slot in which a first resource is located, or an offset value of a slot in which the first resource is located relative to the slot in which the SCI is received;

second timing information k, wherein for the SCI received in a slot m, a slot in which the first resource is located is m−k, or a slot in which the first resource is located is n, the second terminal receives the SCI in a slot n+k;

first indication information, wherein the first indication information is configured to indicate time offset values relative to a first resource, a second resource and/or the third resource.

In the embodiments of the present disclosure, the frequency domain resource assignment information includes at least one of the following:

first offset information, which is an offset value of a start sub-channel of the first resource relative to a sub-channel on which the lowest PRB from which the SCI is received is located, or an offset value of the sub-channel on which the lowest PRB from which the SCI is received is located relative to the start sub-channel of the first resource;

second offset information p, wherein the start sub-channel of the first resource is q, the sub-channel on which the lowest PRB from which the SCI is received is located is q+p, or the sub-channel on which the lowest PRB from which the SCI is received is located is r, the start sub-channel of the first resource is r+p;

second indication information, wherein the second indication information is configured to indicate a start sub-channel of the first resource;

third indication information which is configured to indicate the number of sub-channels allocated consecutively for each resource and start sub-channel indexes of remaining SCI indication resources other than the first resource.

In the embodiments of the present disclosure, "+" or "−" represents only offset values, for example, a case that p is a negative number for q+p is equivalent to q−(−1)).

In the embodiments of the present disclosure, determining the resource blocks and the slots indicated by resources carrying the SCI, and/or the time domain resource assignment information and/or the frequency domain resource assignment information in the SCI includes at least one of the following:

determining a resource slot according to the resources of the SCI and/or the time domain resource assignment information in the SCI;

determining the slot in which the first resource is located, according to the first timing information or the second timing information;

determining the time offset values relative to the first resource, the second resource, and/or the third resource according to first indication information.

Determining the resource slot according to the resources of the SCI and/or the time domain resource assignment information in the SCI includes: for SCI reception ending in a slot m, determining that the slot in which the first resource is located is a slot m−k.

In the embodiments of the present disclosure, determining the resource blocks and the slots indicated by resources carrying the SCI, and/or the time domain resource assignment information and/or the frequency domain resource assignment information in the SCI includes at least one of the following:

determining a sub-channel according to resources of the SCI and/or the frequency domain resource assignment information in the SCI;

determining the start sub-channel of the first resource according to first offset information or second offset information or second indication information;

determining the number of sub-channels continuously allocated for each resource and start sub-channel indexes of remaining SCI indication resources other than the first resource according to the third indication information.

In the embodiments of the present disclosure, determining the sub-channel according to resources of the SCI and/or the frequency domain resource assignment information in the SCI includes: determining a start sub-channel of the first resource as r+p or r for the sub-channel r in which the lowest PRB of the received SCI is located.

In the embodiments of the present disclosure, the method further includes:

Step 202: excluding candidate single-slot resources when the second condition is satisfied, wherein, the second condition is that the resource blocks and slots indicated by the SCI, or the resource blocks and slots determined according to the same or different SCI formats assumed to be received in a second slot set, overlap with the candidate single-slot resources.

In order to implement the above method embodiments, the embodiments of the present disclosure further provides an information transmission device. As shown in FIG. 3, the device is applied to a first terminal, and includes: a transmitting module 301 configured to transmit Sidelink control information (SCI) when a first condition is satisfied.

The first condition is defined by a protocol, is preconfigured, or is configured by a network side or a second terminal through high-layer signaling.

Here, the high-layer signaling includes SIB RRC MAC signaling.

In the embodiments of the present disclosure, the first condition includes at least one of following:

reference signal received power (RSRP) measurement performed for a received SCI format is higher than a first threshold;

a priority value indicated by a priority field in the received SCI format is below a second threshold;

the RSRP measurement performed for the received SCI format is higher than the first threshold, and the priority value indicated by the priority field in the received SCI format is below the second threshold;

slots and/or resource blocks determined by received multiple SCI formats overlap;

a first distance is less than or equal to a first preset distance, and/or a second distance is greater than or equal to a second preset distance; the first distance is a distance between a position of a first terminal and a center position of a nearest zone indicated by a zone identifier Zone_id in the received SCI; the second distance is a distance between the center position of the nearest zone indicated by Zone_id in the received SCI and a position of a second terminal.

Here, the position of the second terminal may be the center location of the nearest zone indicated by Zone_id in the SCI transmitted by the second terminal.

In the embodiments of the present disclosure, the SCI transmitted by the first terminal includes at least one of the following:

a priority which is a value indicated by a priority field in the received SCI format;

a resource reservation period which is a value indicated by a resource reservation period field in the received SCI format;

time domain resource assignment information;

frequency domain resource assignment information.

In the embodiments of the present disclosure, the time domain resource assignment information includes at least one of following:

first timing information, wherein the first timing information is configured to indicate an offset value of a slot in which the first terminal transmits the SCI relative to a slot in which the received SCI format is located, or an offset value of a slot in which the received SCI format is located relative to the slot in which the first terminal transmits the SCI;

second timing information k, wherein for SCI format reception which ends in a slot n or a Physical Sidelink Shared channel (PSSCH) reception scheduled by SCI, the first terminal transmits the SCI in a slot n+k; or, for a SCI transmitted in the slot m, the first terminal receives a SCI format in a slot m−k;

first indication information, wherein the first indication information is a value indicated by a time domain resource assignment field in the received SCI format.

In the embodiments of the present disclosure, the frequency domain resource assignment information includes at least one of following:

first offset information, an offset value of a sub-channel on which a lowest physical resource block (PRB) of the received SCI format is located relative to a sub-channel on which the lowest PRB transmitting the SCI is located, or an offset value of a sub-channel in which the lowest PRB transmitting the SCI is located relative to a sub-channel in which the lowest PRB of the received SCI format is located;

second offset information p, a sub-channel on which the lowest PRB of the received SCI format is located is q, a sub-channel on which the lowest PRB transmitting the SCI by the first terminal is located is q+p, or, a sub-channel on which the lowest PRB transmitting the SCI by the first terminal is located is r, and a sub-channel on which the lowest PRB of the received SCI format is located is r+p;

second indication information, wherein the second indication information is configured to indicate a sub-channel on which the lowest PRB of the received SCI format is located;

third indication information which is a value indicated by a frequency domain resource assignment field in the received SCI format.

In the above solution, the lowest PRB of the received SCI format is the lowest PRB of a PSCCH or a PSSCH of the received SCI format, and the lowest PRB transmitting the SCI is the lowest PRB of a PSCCH or a PSSCH transmitting the SCI.

In the embodiments of the present disclosure, as shown in FIG. 3, the device further includes:

a first processing module 302 configured to determine a resource subset to be reported to a higher layer by at least one of the following ways:

the number L of sub-channels provided by the higher layer for transmission of a Physical Sidelink Control Channel (PSCCH) or a Physical Sidelink Shared Channel (PSSCH) is 1, or the number of sub-channels for transmission of a PSCCH or a PSSCH is set to 1; or, the number L of sub-channels provided by the higher layer for the transmission of the PSCCH or the PSSCH is 1, or the number L of sub-channels configured for transmission of the PSCCH or PSSCH is 1, and candidate single-slot resources correspond to a number of consecutive L sub-channels in a time interval [n+T1, n+T2]; a start sub-channel of consecutive L sub-channels is the same as the sub-channel on which the lowest PRB of the received SCI format is located.

The embodiments of the present disclosure also provide an information transmission device. As shown in FIG. 4, the device is applied to a first terminal, and includes:

a determining module 401 configured for determining resource blocks and slots associated with Sidelink control information (SCI).

In the embodiments of the present disclosure, determining resource blocks and slots associated with the SCI by the determining module 401 includes: determining the resource blocks and the slots indicated by resources carrying the SCI, and/or time domain resource assignment information and/or frequency domain resource assignment information in the SCI.

The SCI is carried by PSCCH resources or PSSCH resources.

In the embodiments of the present disclosure, the time domain resource assignment information includes at least one of the following:

first timing information, wherein the first timing information is configured to indicate an offset value of a slot in which the SCI is received relative to a slot in which a first resource is located, or an offset value of a slot in which the first resource is located relative to the slot in which the SCI is received;

second timing information k, wherein for the SCI received in a slot m, a slot in which the first resource is located is m−k, or a slot in which the first resource is located is n, the second terminal receives the SCI in a slot n+k;

first indication information, wherein the first indication information is configured to indicate time offset values relative to a first resource, a second resource and/or the third resource.

In the embodiments of the present disclosure, the frequency domain resource assignment information includes at least one of the following:

first offset information, which is an offset value of a start sub-channel of the first resource relative to a sub-channel on which the lowest PRB from which the SCI is received is located, or an offset value of the sub-channel on which the lowest PRB from which the SCI is received is located relative to the start sub-channel of the first resource;

second offset information p, wherein the start sub-channel of the first resource is q, the sub-channel on which the lowest PRB from which the SCI is received is located is q+p, or the sub-channel on which the lowest PRB from which the SCI is received is located is r, the start sub-channel of the first resource is r+p;

second indication information, wherein the second indication information is configured to indicate a start sub-channel of the first resource;

third indication information which is configured to indicate the number of sub-channels allocated consecutively for each resource and start sub-channel indexes of remaining SCI indication resources other than the first resource.

In the embodiments of the present disclosure, determining the resource blocks and the slots indicated by resources carrying the SCI, and/or the time domain resource assignment information and/or the frequency domain resource assignment information in the SCI by the determining module 401 includes at least one of the following:

determining a resource slot according to the resources of the SCI and/or the time domain resource assignment information in the SCI;

determining the slot in which the first resource is located, according to the first timing information or the second timing information;

determining the time offset values relative to the first resource, the second resource, and/or the third resource according to the first indication information.

Determining the resource slot according to the resources of the SCI and/or the time domain resource assignment information in the SCI by the determining module 401 includes: for SCI reception ending in a slot m, determining that the slot in which the first resource is located is a slot m−k.

In the embodiments of the present disclosure, determining the resource blocks and the slots indicated by resources carrying the SCI, and/or the time domain resource assignment information and/or the frequency domain resource assignment information in the SCI by the determining module 401 includes at least one of the following:

determining a sub-channel according to resources of the SCI and/or the frequency domain resource assignment information in the SCI;

determining the start sub-channel of the first resource according to first offset information or second offset information or second indication information;

determining the number of sub-channels continuously allocated for each resource and start sub-channel indexes of remaining SCI indication resources other than the first resource according to the third indication information.

In the embodiments of the present disclosure, determining the sub-channel according to resources of the SCI and/or the frequency domain resource assignment information in the SCI by the determining module 401 includes: determining a start sub-channel of the first resource as r+p or r for the sub-channel r in which the lowest PRB of the received SCI is located.

In the embodiments of the present disclosure, as shown in FIG. 4, the device further includes:

a second processing module 402 configured for excluding candidate single-slot resources when a second condition is satisfied, wherein, the second condition is that the resource blocks and slots indicated by the SCI, or the resource blocks and slots determined according to the same or different SCI formats assumed to be received in a second slot set, overlap with the candidate single-slot resources.

The embodiments of the present disclosure further provide an information transmission device. The information transmission device includes: a processor and a memory storing a computer program executable by the processor, wherein, when the processor executes the computer program, the processor implements:

transmitting Sidelink control information (SCI) when a first condition is satisfied, wherein the first condition is defined by a protocol, is preconfigured, or is configured by a network side or a second terminal through high-layer signaling.

The first condition includes at least one of following:

reference signal received power (RSRP) measurement performed for a received SCI format is higher than a first threshold;

a priority value indicated by a priority field in the received SCI format is below a second threshold;

the RSRP measurement performed for the received SCI format is higher than the first threshold, and the priority value indicated by the priority field in the received SCI format is below the second threshold;

slots and/or resource blocks determined by received multiple SCI formats overlap;

a first distance is less than or equal to a first preset distance, and/or a second distance is greater than or equal to a second preset distance; the first distance is a distance between a position of a first terminal and a center position of a nearest zone indicated by a zone identifier Zone_id in the received SCI; the second distance is a distance between the center position of the nearest zone indicated by Zone_id in the received SCI and a position of a second terminal.

The SCI transmitted by the first terminal includes at least one of the following:

a priority which is a value indicated by a priority field in the received SCI format;

a resource reservation period which is a value indicated by a resource reservation period field in the received SCI format;

time domain resource assignment information;

frequency domain resource assignment information.

The time domain resource assignment information includes at least one of following:

first timing information, wherein the first timing information is configured to indicate an offset value of a slot in which the first terminal transmits the SCI relative to a slot in which the received SCI format is located, or an offset value of a slot in which the received SCI format is located relative to the slot in which the first terminal transmits the SCI;

second timing information k, wherein for SCI format reception which ends in a slot n or a Physical Sidelink Shared channel (PSSCH) reception scheduled by SCI, the first terminal transmits the SCI in a slot n+k; or, for a SCI transmitted in the slot m, the first terminal receives a SCI format in a slot m−k;

first indication information, wherein the first indication information is a value indicated by a time domain resource assignment field in the received SCI format.

The frequency domain resource assignment information includes at least one of following:

first offset information, an offset value of a sub-channel on which a lowest physical resource block (PRB) of the received SCI format is located relative to a sub-channel on which the lowest PRB transmitting the SCI is located, or an offset value of a sub-channel in which the lowest PRB transmitting the SCI is located relative to a sub-channel in which the lowest PRB of the received SCI format is located;

second offset information p, a sub-channel on which the lowest PRB of the received SCI format is located is q, a sub-channel on which the lowest PRB transmitting the SCI by the first terminal is located is q+p, or, a sub-channel on which the lowest PRB transmitting the SCI by the first terminal is located is r, and a sub-channel on which the lowest PRB of the received SCI format is located is r+p;

second indication information, wherein the second indication information is configured to indicate a sub-channel on which the lowest PRB of the received SCI format is located;

third indication information which is a value indicated by a frequency domain resource assignment field in the received SCI format.

When the computer program is executed by the processor, the processor further implements: determining a resource subset to be reported to a higher layer by at least one of the following ways:

the number L of sub-channels provided by the higher layer for transmission of a Physical Sidelink Control Channel (PSCCH) or a Physical Sidelink Shared Channel (PSSCH) is 1, or the number of sub-channels for transmission of a PSCCH or a PSSCH is set to 1; or, the number L of sub-channels provided by the higher layer for the transmission of the PSCCH or the PSSCH is 1, or the number L of sub-channels configured for transmission of the PSCCH or PSSCH is 1, and candidate single-slot resources correspond to a number of consecutive L sub-channels in a time interval [n+T1, n+T2]; a start sub-channel of consecutive L sub-channels is the same as the sub-channel on which the lowest PRB of the received SCI format is located.

The embodiments of the present disclosure further provide an information transmission device. The information transmission device includes: a processor and a memory storing a computer program executable by the processor, wherein, when the processor executes the computer program, the processor implements:

determining resource blocks and slots associated with Sidelink control information (SCI).

When determining the resource blocks and the slots associated with the SCI, the processor further implements following when the processor executes the computer program: determining the resource blocks and the slots indicated by resources carrying the SCI, and/or time domain resource assignment information and/or frequency domain resource assignment information in the SCI.

The time domain resource assignment information includes at least one of the following:

first timing information, wherein the first timing information is configured to indicate an offset value of a slot in which the SCI is received relative to a slot in which a first resource is located, or an offset value of a slot in which the first resource is located relative to the slot in which the SCI is received;

second timing information k, wherein for the SCI received in a slot m, a slot in which the first resource is located is m−k, or a slot in which the first resource is located is n, the second terminal receives the SCI in a slot n+k;

first indication information, wherein the first indication information is configured to indicate time offset values relative to a first resource, a second resource and/or a third resource.

The frequency domain resource assignment information includes at least one of the following:

first offset information, which is an offset value of a start sub-channel of the first resource relative to a sub-channel on which the lowest PRB from which the SCI is received is located, or an offset value of the sub-channel on which the lowest PRB from which the SCI is received is located relative to the start sub-channel of the first resource;

second offset information p, wherein the start sub-channel of the first resource is q, the sub-channel on which the lowest PRB from which the SCI is received is located is q+p, or the sub-channel on which the lowest PRB from which the SCI is received is located is r, the start sub-channel of the first resource is r+p;

second indication information, wherein the second indication information is configured to indicate a start sub-channel of the first resource;

third indication information which is configured to indicate the number of sub-channels allocated consecutively for each resource and start sub-channel indexes of remaining SCI indication resources other than the first resource.

When determining the resource blocks and the slots indicated by resources carrying the SCI, and/or the time domain resource assignment information and/or the frequency domain resource assignment information in the SCI, the processor further implements at least one of the following when the processor implements the computer program:

determining a resource slot according to the resources of the SCI and/or the time domain resource assignment information in the SCI;

determining the slot in which the first resource is located, according to the first timing information or the second timing information;

determining the time offset values relative to the first resource, the second resource, and/or the third resource according to first indication information.

When determining the resource slot according to the resources of the SCI and/or the time domain resource assignment information in the SCI, the processor further implements the following when the processor implements the computer program:

for SCI reception ending in a slot m, determining that the slot in which the first resource is located is a slot m−k.

When determining the resource blocks and the slots indicated by resources carrying the SCI, and/or the time domain resource assignment information and/or the frequency domain resource assignment information in the SCI, the processor further implements at least one of the following when the processor implements the computer program:

determining a sub-channel according to resources of the SCI and/or the frequency domain resource assignment information in the SCI;

determining the start sub-channel of the first resource according to first offset information or second offset information or second indication information;

determining the number of sub-channels continuously allocated for each resource and start sub-channel indexes of remaining SCI indication resources other than the first resource according to the third indication information.

When determining the sub-channel according to resources of the SCI and/or the frequency domain resource assignment information in the SCI, the processor further implements following when the processor executes the computer program:

determining a start sub-channel of the first resource as r+p or r for the sub-channel r in which the lowest PRB of the received SCI is located.

When the processor implements the computer program, the processor further implements:

excluding candidate single-slot resources when the second condition is satisfied, wherein, the second condition is that the resource blocks and slots indicated by the SCI, or the resource blocks and slots determined according to the same or different SCI formats assumed to be received in a second slot set, overlap with the candidate single-slot resources.

It should be noted that the device provided in the above embodiment is only exemplified by division of the above program modules when transmitting information, and in practical application, the above-described processing distribution may be performed by different program modules according to need, that is, an internal structure of the device is divided into different program modules to perform all or part of the above-described processing. In addition, the device provided by the above embodiment and corresponding method embodiment belong to the same concept, and the specific implementation processes thereof are detailed in the method embodiments, which are not repeated here.

In an exemplary embodiment, embodiments of the present disclosure also provide a computer-readable storage medium. The computer readable storage medium may be a memory such as a FRAM, ROM, PROM, EPROM, EEPROM, Flash Memory, a magnetic surface memory, an optical disc, or a CD-ROM, or various devices including one or any combination thereof, such as mobile phones, computers, tablet devices, personal digital assistants, etc.

The embodiments of the present disclosure also provide a computer-readable storage medium having stored thereon a computer program. When the computer program is executed by a processor, the processor performs following:

when a first condition is satisfied, transmitting Sidelink control information (SCI).

The first condition is defined by a protocol, is preconfigured, or is configured by a network side or a second terminal through high-layer signaling.

The first condition includes at least one of following:

reference signal received power (RSRP) measurement performed for a received SCI format is higher than a first threshold;

a priority value indicated by a priority field in the received SCI format is below a second threshold;

the RSRP measurement performed for the received SCI format is higher than the first threshold, and the priority value indicated by the priority field in the received SCI format is below the second threshold;

slots and/or resource blocks determined by received multiple SCI formats overlap;

a first distance is less than or equal to a first preset distance, and/or a second distance is greater than or equal to a second preset distance; the first distance is a distance between a position of a first terminal and a center position of a nearest zone indicated by a zone identifier Zone_id in the received SCI; the second distance is a distance between the center position of the nearest zone indicated by Zone_id in the received SCI and a position of a second terminal.

The SCI transmitted by the first terminal includes at least one of the following:

a priority which is a value indicated by a priority field in the received SCI format;

a resource reservation period which is a value indicated by a resource reservation period field in the received SCI format;

time domain resource assignment information;

frequency domain resource assignment information.

The time domain resource assignment information includes at least one of following:

first timing information, wherein the first timing information is configured to indicate an offset value of a slot in which the first terminal transmits the SCI relative to a slot in which the received SCI format is located, or an offset value of a slot in which the received SCI format is located relative to the slot in which the first terminal transmits the SCI;

second timing information k, wherein for SCI format reception which ends in a slot n or a Physical Sidelink Shared channel (PSSCH) reception scheduled by SCI, the first terminal transmits the SCI in a slot n+k; or, for a SCI transmitted in the slot m, the first terminal receives a SCI format in a slot m−k;

first indication information, wherein the first indication information is a value indicated by a time domain resource assignment field in the received SCI format.

The frequency domain resource assignment information includes at least one of following:

first offset information, an offset value of a sub-channel on which a lowest physical resource block (PRB) of the received SCI format is located relative to a sub-channel on which the lowest PRB transmitting the SCI is located, or an offset value of a sub-channel in which the lowest PRB transmitting the SCI is located relative to a sub-channel in which the lowest PRB of the received SCI format is located;

second offset information p, a sub-channel on which the lowest PRB of the received SCI format is located is q, a sub-channel on which the lowest PRB transmitting the SCI by the first terminal is located is q+p, or, a sub-channel on which the lowest PRB transmitting the SCI by the first terminal is located is r, and a sub-channel on which the lowest PRB of the received SCI format is located is r+p;

second indication information, wherein the second indication information is configured to indicate a sub-channel on which the lowest PRB of the received SCI format is located;

third indication information which is a value indicated by a frequency domain resource assignment field in the received SCI format.

When the computer program is executed by the processor, the processor further implements: determining a resource subset to be reported to a higher layer by at least one of the following ways:

the number L of sub-channels provided by the higher layer for transmission of a Physical Sidelink Control Channel (PSCCH) or a Physical Sidelink Shared Channel (PSSCH) is 1, or the number of sub-channels for transmission of a PSCCH or a PSSCH is set to 1; or, the number L of sub-channels provided by the higher layer for the transmission of the PSCCH or the PSSCH is 1, or the number L of sub-channels configured for transmission of the PSCCH or PSSCH is 1, and candidate single-slot resources correspond to a number of consecutive L sub-channels in a time interval [n+T1, n+T2]; a start sub-channel of consecutive L sub-channels is the same as the sub-channel on which the lowest PRB of the received SCI format is located.

The embodiments of the present disclosure also provide a computer-readable storage medium having stored thereon a computer program. When the computer program is executed by a processor, the processor performs following:

determining resource blocks and slots associated with Sidelink control information (SCI).

When determining resource blocks and slots associated with the SCI, the processor further implements following when the computer program is executed by the processor: determining the resource blocks and the slots indicated by resources carrying the SCI, and/or time domain resource assignment information and/or frequency domain resource assignment information in the SCI.

The time domain resource assignment information includes at least one of the following:

first timing information, wherein the first timing information is configured to indicate an offset value of a slot in which the SCI is received relative to a slot in which a first resource is located, or an offset value of a slot in which the first resource is located relative to the slot in which the SCI is received;

second timing information k, wherein for the SCI received in a slot m, a slot in which the first resource is located is m−k, or a slot in which the first resource is located is n, the second terminal receives the SCI in a slot n+k;

first indication information, wherein the first indication information is configured to indicate time offset values relative to a first resource, a second resource and/or the third resource.

The frequency domain resource assignment information includes at least one of the following:

first offset information, which is an offset value of a start sub-channel of the first resource relative to a sub-channel on which the lowest PRB from which the SCI is received is located, or an offset value of the sub-channel on which the lowest PRB from which the SCI is received is located relative to the start sub-channel of the first resource;

second offset information p, wherein the start sub-channel of the first resource is q, the sub-channel on which the lowest PRB from which the SCI is received is located is q+p, or the sub-channel on which the lowest PRB from which the SCI is received is located is r, the start sub-channel of the first resource is r+p;

second indication information, wherein the second indication information is configured to indicate a start sub-channel of the first resource;

third indication information which is configured to indicate the number of sub-channels allocated consecutively for each resource and start sub-channel indexes of remaining SCI indication resources other than the first resource.

When determining the resource blocks and the slots indicated by resources carrying the SCI, and/or the time domain resource assignment information and/or the frequency domain resource assignment information in the SCI, the processor further implements at least one of the following when the computer program is executed by the processor:

determining a resource slot according to the resources of the SCI and/or the time domain resource assignment information in the SCI;

determining the slot in which the first resource is located, according to the first timing information or the second timing information;

determining the time offset values relative to the first resource, the second resource, and/or the third resource according to first indication information.

When determining the resource slot according to the resources of the SCI and/or the time domain resource assignment information in the SCI, the processor further implements the following when the computer program is executed by the processor: for SCI reception ending in a slot m, determining that the slot in which the first resource is located is a slot m−k.

When determining the resource blocks and the slots indicated by resources carrying the SCI, and/or the time domain resource assignment information and/or the frequency domain resource assignment information in the SCI, the processor further implements at least one of the following when the computer program is executed by the processor:

determining a sub-channel according to resources of the SCI and/or the frequency domain resource assignment information in the SCI;

determining the start sub-channel of the first resource according to first offset information or second offset information or second indication information;

determining the number of sub-channels continuously allocated for each resource and start sub-channel indexes of remaining SCI indication resources other than the first resource according to the third indication information.

When determining the sub-channel according to resources of the SCI and/or the frequency domain resource assignment information in the SCI, the processor further implements the following when the computer program is executed by the processor: determining a start sub-channel of the first resource as r+p or r for the sub-channel r in which the lowest PRB of the received SCI is located.

The processor further implements the following when the computer program is executed by the processor: excluding candidate single-slot resources when the second condition is satisfied, wherein, the second condition is that the resource blocks and slots indicated by the SCI, or the resource blocks and slots determined according to the same or different SCI formats assumed to be received in a second slot set, overlap with the candidate single-slot resources.

The present disclosure is described hereinafter in connection with a scenario embodiment.

This embodiment proposes a resource selection method based on coordination between a transmitting end and a receiving end, wherein the receiving end converts a result of perceiving a hidden node into by the receiving end, as resource reservation information and broadcasting the resource reservation information by transmitting the Sidelink control information. It can be avoided as much as possible that resources occupied by the hidden node are selected by the transmitting end, thereby reducing the interference of data transmission and improving the reliability.

The method for transmitting Sidelink control information in this embodiment mainly includes three aspects, as follows.

1. Conditions for the terminal to transmit the Sidelink control information (the terminal represents the receiving end).

The terminal transmits the Sidelink control information when at least one of the following conditions is satisfied:

reference signal received power (RSRP) measurement performed for a SCI format received at a first slot is higher than a first threshold;

a priority value indicated by a priority field in the SCI format received in a first slot is lower than a second threshold;

the RSRP measurement performed for the SCI format received in a first slot is higher than the first threshold, and the priority value indicated by the priority field in the SCI format received in the first slot is below the second threshold;

a first distance is less than or equal to a first preset distance, and/or a second distance is greater than or equal to a second preset distance; the first distance is a distance between a position of a first terminal and a center position of a nearest zone indicated by a zone identifier Zone_id in the received SCI; the second distance is a distance between the center position of the nearest zone indicated by Zone_id in the received SCI and a position of a second terminal.

2. Contents of the Sidelink control information a priority which is a value indicated by a priority field in the SCI format received in the first slot;

a resource reservation period which is a value indicated by a resource reservation period field in the SCI format received in the first slot;

time domain resource assignment information, such as Time resource assignment;

frequency domain resource assignment information.

The time domain resource allocation information includes at least one of following:

first timing information, wherein the first timing information is configured to indicate an offset value of a slot in which the first terminal transmits the SCI relative to the first slot, or an offset value of the first slot relative to the slot in which the first terminal transmits the SCI;

second timing information k, wherein for SCI format reception which ends in a slot n or a Physical Sidelink Shared channel (PSSCH) reception scheduled by SCI, the first terminal transmits the SCI in a slot n+k; or, for a SCI transmitted in the slot m, the first terminal receives an SCI format in a slot m−k;

first indication information, wherein the first indication information is a value indicated by a time domain resource assignment field in the SCI format received in the first slot.

The frequency domain resource allocation information includes at least one of following:

first offset information, an offset value of a sub-channel on which a lowest physical resource block (PRB) of the received SCI format is located relative to a sub-channel on which the lowest PRB transmitting the SCI is located, or an offset value of a sub-channel in which the lowest PRB transmitting the SCI is located relative to a sub-channel in which the lowest PRB of the received SCI format is located;

second offset information p, a sub-channel on which the lowest PRB of the received SCI format is located is q, a sub-channel on which the lowest PRB transmitting the SCI by the first terminal is located is q+p, or, a sub-channel on which the lowest PRB transmitting the SCI by the first terminal is located is r, and a sub-channel on which the lowest PRB of the received SCI format is located is r+p;

second indication information, wherein the second indication information is configured to indicate a sub-channel on which the lowest PRB of the received SCI format is located;

third indication information which is a value indicated by a frequency domain resource assignment field in the SCI format in the first slot.

3. The terminal determines the resource subset to be reported to the high layer through at least one of the following manners:

the number L of sub-channels provided by the higher layer for transmission of a Physical Sidelink Control Channel (PSCCH) or a Physical Sidelink Shared Channel (PSSCH) is 1, or the number of sub-channels for transmission of a PSCCH or a PSSCH is set to 1; or, the number L of sub-channels provided by the higher layer for the transmission of the PSCCH or the PSSCH is 1, or the number L of sub-channels configured for transmission of the PSCCH or PSSCH is 1, and candidate single-slot resources correspond to a number of consecutive L sub-channels in a time interval [n+T1, n+T2]; a start sub-channel of consecutive L sub-channels is the same as the sub-channel on which the lowest PRB of the received SCI format is located.

The above description describes the embodiment of the present disclosure, and is not intended to limit the protection scope of the present disclosure.

What is claimed is:

1. An information transmission method performed by a first terminal, comprising:

transmitting Sidelink control information (SCI) when a first condition is satisfied;

wherein the first condition is defined by a protocol, is preconfigured, or is configured by a network side or a second terminal through a high-layer signaling, wherein the SCI transmitted by the first terminal comprises at least one of the following:

a priority which is a value indicated by a priority field in a received SCI format;

a resource reservation period which is a value indicated by a resource reservation period field in the received SCI format;

time domain resource assignment information;

frequency domain resource assignment information, wherein the time domain resource assignment information comprises at least one of following:

first timing information, wherein the first timing information is configured to indicate an offset value of a slot in which the first terminal transmits the SCI relative to a slot in which the received SCI format is located, or an offset value of a slot in which the received SCI format is located relative to a slot in which the first terminal transmits the SCI;

second timing information k, wherein for SCI format reception which ends in a slot n or a Physical Sidelink Shared channel (PSSCH) reception scheduled by the SCI, the first terminal transmits the SCI in a slot n+k; or, for a SCI transmitted in a slot m, the first terminal receives a SCI format in a slot m−k;

first indication information, wherein the first indication information is a value indicated by a time domain resource assignment field in the received SCI format;

wherein the frequency domain resource assignment information comprises at least one of following:

first offset information, which is an offset value of a sub-channel on which a lowest physical resource block (PRB) of the received SCI format is located relative to a sub-channel on which the lowest PRB transmitting the SCI is located, or an offset value of a sub-channel in which the lowest PRB transmitting the SCI is located relative to a sub-channel in which the lowest PRB of the received SCI format is located;

second offset information p, wherein a sub-channel on which the lowest PRB of the received SCI format is located is q, a sub-channel on which the lowest PRB transmitting the SCI by the first terminal is located is q+p, or, a sub-channel on which the lowest PRB transmitting the SCI by the first terminal is located is r, and a sub-channel on which the lowest PRB of the received SCI format is located is r+p;

second indication information, which is configured to indicate a sub-channel on which the lowest PRB of the received SCI format is located;

third indication information which is a value indicated by a frequency domain resource assignment field in the received SCI format, wherein the first condition comprises at least one of following:

reference signal received power (RSRP) measurement performed for a received SCI format is higher than a first threshold;

a priority value indicated by a priority field in the received SCI format is below a second threshold;

the RSRP measurement performed for the received SCI format is higher than the first threshold, and the priority value indicated by the priority field in the received SCI format is below the second threshold;

slots and/or resource blocks determined by received multiple SCI formats overlap;

a first distance is less than or equal to a first preset distance, and/or a second distance is greater than or equal to a second preset distance; the first distance is a distance between a position of the first terminal and a center position of a nearest zone indicated by a zone identifier Zone_id in a received SCI; the second distance is a distance between the center position of the nearest zone indicated by Zone_id in the received SCI and a position of a second terminal.

2. The method according to claim 1, further comprising:

determining a resource subset to be reported to a higher layer by at least one of the following ways:

a quantity L of sub-channels provided by the higher layer for transmission of a Physical Sidelink Control Channel (PSCCH) or a Physical Sidelink Shared Channel (PSSCH) is 1, or a quantity of sub-channels for transmission of a PSCCH or a PSSCH is set to 1; or, a quantity L of sub-channels provided by the higher layer for the transmission of the PSCCH or the PSSCH is 1, or a quantity L of sub-channels configured for transmission of the PSCCH or PSSCH is 1, and candidate single-slot resources correspond to a number of consecutive L sub-channels in a time interval [n+T1, n+T2]; a start sub-channel of consecutive L sub-channels is the same as a sub-channel on which a lowest PRB of a received SCI format is located.

3. An information transmission device, comprising:

a processor, and a memory for storing a computer program executable on the processor, wherein when the processor executes the computer program, the processor implements steps of the method according to claim 1.

4. A non-transitory computer readable storage medium having a computer program stored thereon, wherein when the computer program is executed by a processor, the processor implements steps of the method according to claim 1.

\*    \*    \*    \*    \*